United States Patent [19]
Ruben

[11] 3,766,463
[45] Oct. 16, 1973

[54] BATTERY CHARGING CIRCUIT WITH SCR'S TRIGGERED BY UNIJUNCTION CIRCUITS HAVING MEANS FOR PREVENTING UNIJUNCTION FROM BEING LATCHED ON

[76] Inventor: Murray A. Ruben, 34 Cushing Ave., Belmont, Mass.

[22] Filed: Dec. 17, 1971

[21] Appl. No.: 209,189

[52] U.S. Cl............... 320/23, 320/39, 320/DIG. 2, 323/22 SCR
[51] Int. Cl. ............................................ H02j 7/10
[58] Field of Search .................. 320/32, 33, 39, 40, 320/21, 21 TD, DIG. 2, 22–24; 323/22 SCR, 34

[56] References Cited
UNITED STATES PATENTS
| | | | |
|---|---|---|---|
| 3,300,704 | 1/1967 | McMillen | 320/40 X |
| 3,382,425 | 5/1968 | Legatti | 320/32 |
| 3,427,528 | 2/1969 | Custer | 320/DIG. 2 UX |
| 3,553,561 | 1/1971 | Lesher | 320/39 X |

OTHER PUBLICATIONS
G.E. SCR Manual 4th Ed., 1967 "AC–Phase Control," pp. 192–195.

Primary Examiner—J. D. Miller
Assistant Examiner—Robert J. Hickey
Attorney—Charles Hieken

[57] ABSTRACT

A circuit for battery charging includes an SCR that is periodically gated on for a duration corresponding to the state of charge of the battery, being gated on for only a short interval when the battery is essentially fully charged to keep it charged. The conduction angle is determined from the open-circuit battery potential and the previous charging history of the battery obtained from potential sensing circuits. A pedestal and cosine modified ramp circuit triggers the SCR's through capacitors with a resistor intercoupling the SCR gate and cathode electrodes. Circuitry prevents the unijunction transistor in the latter circuit from remaining latched on. A potential control circuit for determining the rate of charge includes a resistor connected to the output terminal that is bypassed when the average value of the signal on the collector of a transistor having its base connected to the output terminal exceeds a predetermined value. Diodes intercouple the SCR's and the emitter of the latter transistor for providing operating potentials to the circuits and a starting charging current to the output terminal when a connected battery is fully discharged.

12 Claims, 6 Drawing Figures

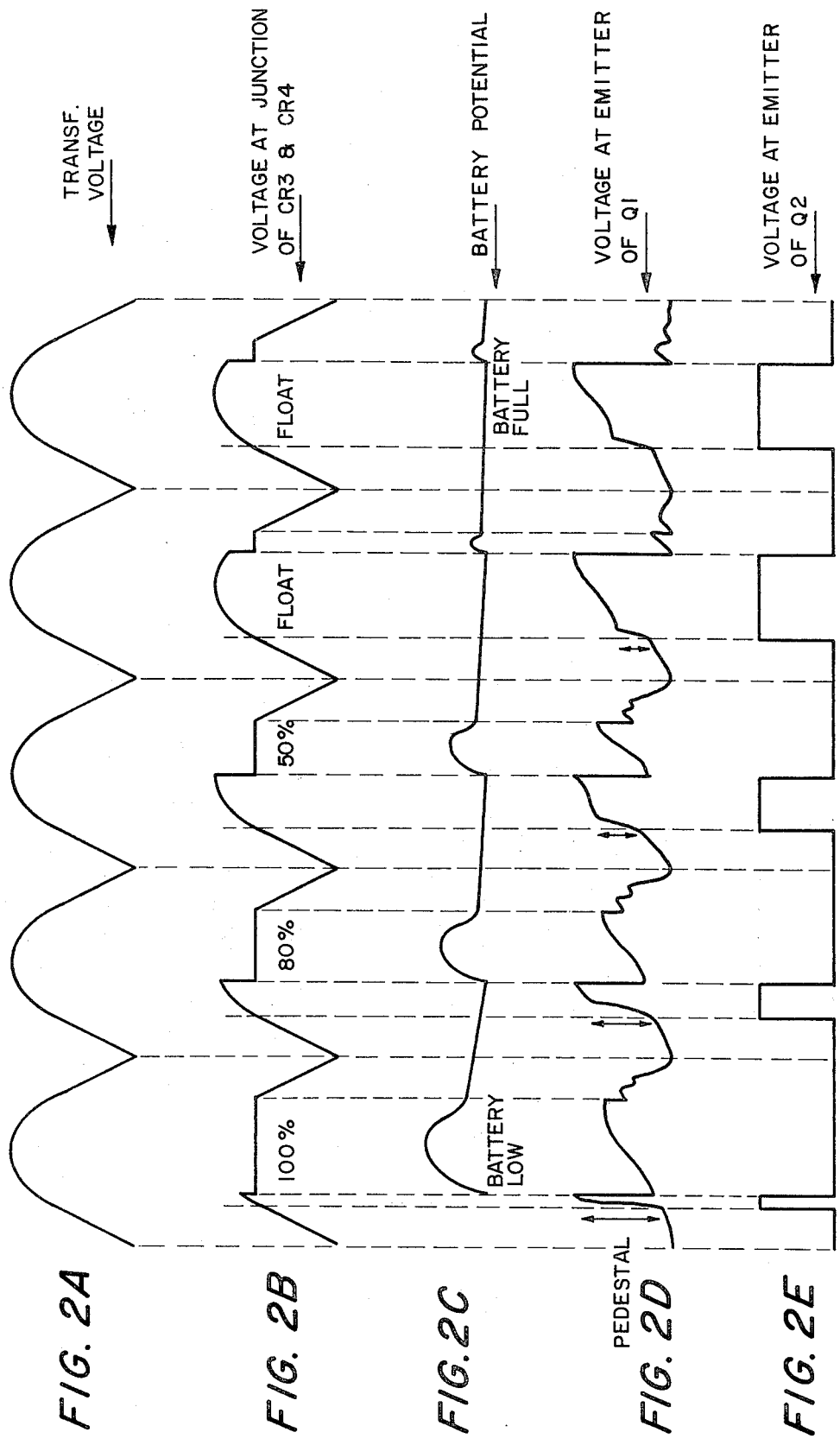

BATTERY CHARGING CIRCUIT WITH SCR'S TRIGGERED BY UNIJUNCTION CIRCUITS HAVING MEANS FOR PREVENTING UNIJUNCTION FROM BEING LATCHED ON

BACKGROUND OF THE INVENTION

The present invention relates in general to battery charging and more particularly concerns novel methods and means for rapidly restoring charge to a low battery, tapering off the charge as the battery reaches full charge, avoiding overcharge and providing charge to keep the battery fully charged. These results are accomplished with reliable circuitry that is relatively inexpensive and economical to operate.

It is an important object of this invention to provide improved battery charging circuitry.

It is a further object of the invention to achieve the preceding objects with circuitry that relatively rapidly recharges a low battery without overcharging it and helps keep the charged battery fully charged.

It is a further object of the invention to achieve one or more of the preceding objects with reliable circuitry that is relatively inexpensive to fabricate and relatively easy to adjust,

SUMMARY OF THE INVENTION

According to the invention, there is a source of a-c energy and an SCR for providing current pulses of controlled duration to a battery terminal. Means are provided for sampling the potential on the battery terminal at the beginning of a power cycle and for setting the firing angle for that cycle to establish a conduction angle proportional to the state of charge of a battery connected to the battery terminal, Preferably the means for controlling the means for setting the firing angle for each cycle comprises a pedestal and cosine modified ramp (PCMR) unijunction trigger circuit for providing the correct charging current to the battery, regardless of its state of charge, and sensitive only to its state of charge.

A feature of the invention includes a potential control circuit means comprising switching means actuated when the battery potential reaches a predetermined value, typically 6.9 volts for a 6 volt battery, to reduce the battery potential to the float potential, typically 6.53 volts for a 6 volt battery, to cause the battery to recharge more rapidly while producing a small amount of gassing that tends to mix the electrolyte, reduce its acid gradients and thereby provide a more uniform charge.

Numerous other features, objects and advantages of the invention will become apparent from the following specification when read in connection with the accompanying drawing in which:

BRIEF DESCRIPTION OF THE DRAWING

FIGS. 2A–2E are graphical representations of signal waveforms plotted to a common time scale that is greatly compressed to illustrate the nature of the waveforms as the state of charge of the battery progresses from low to fully charged.

DETAILED DESCRIPTION OF THE INVENTION

Figure 1:
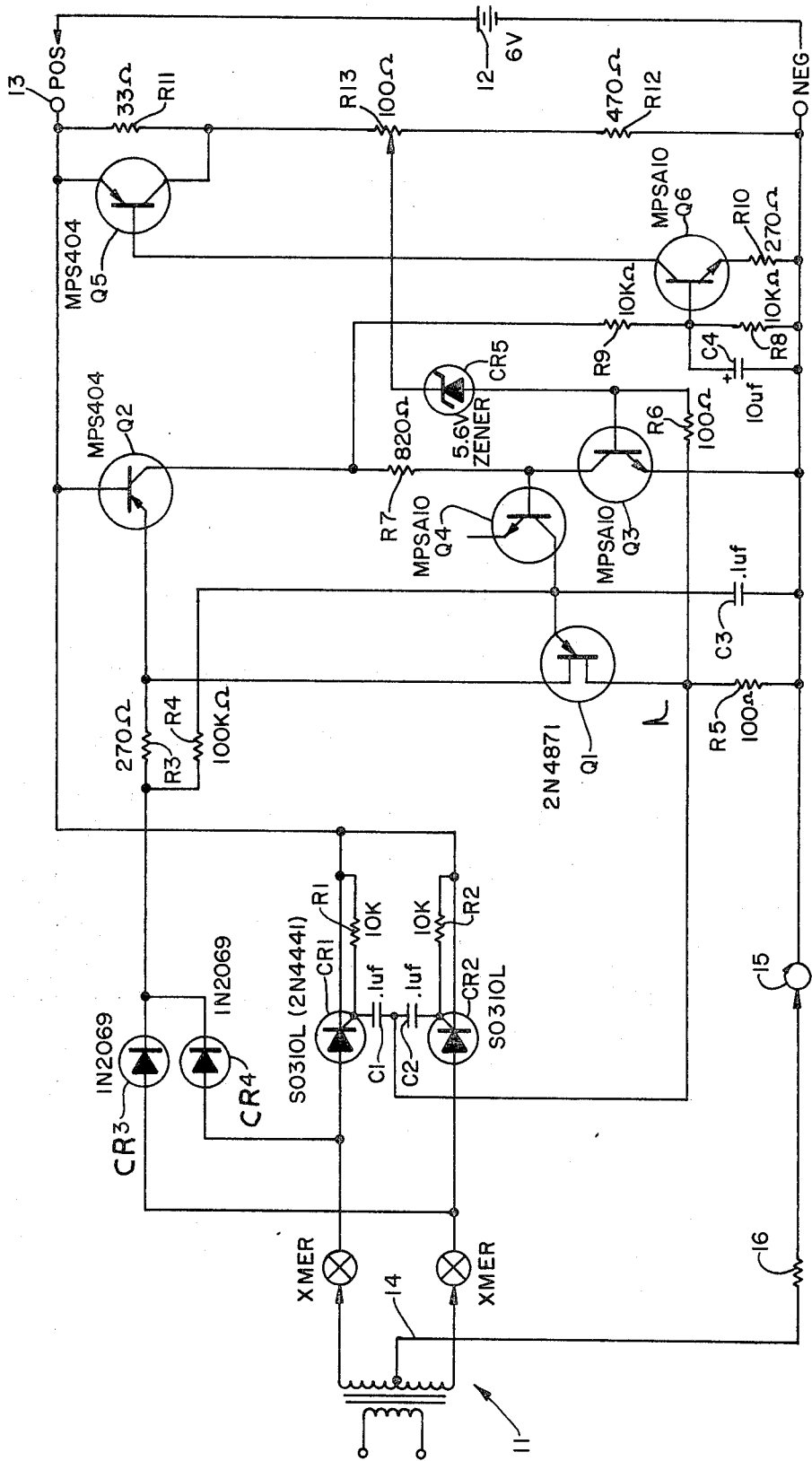
FIG. 1 is a schematic circuit diagram of a preferred imbodiment of the invention.

With reference now to the drawing and more particularly FIG. 1 thereof, there is shown a schematic circuit diagram of a preferred embodiment of the invention. Fundamentally, the circuit according to the invention may be grouped into the power circuits, the trigger circuits and the potential control circuits. Power delivered to the primary of transformer 11, typically from a 110 volt a-c line, is controlled to keep the battery 12 charged.

The power circuits comprise center-tapped transformer 11 having its secondary in series with SCR's CR1 and CR2 forming a full-wave, center-tapped d-c power power supply with the cathodes of the SCR's connected to positive terminal 13 to which the positive terminal of battery 12 is connected. The center tap 14 of transformer 11 is direct-coupled through ballast resistor 16, if necessary, to negative terminal 15 to which the negative terminal of battery 12 is connected.

The trigger circuit comprises unijunction transistor Q1, resistors R3, R4 and R5 and capacitor C3. This pedestal and cosine modified ramp (PCMR) circuit produces a pulse across lower base resistor R5 when the voltage on its emitter exceeds a predetermined value. Capacitors C1 and C2 couple this pulse to the gates of SCR's CR1 and CR2 to fire the forward-biased one of them. Resistors R1 and R2 bias the gate electrodes to cathode potential.

Transistors Q2, Q3 and Q4 (the latter functioning as a diode) and associated circuitry coact to sense the potential on positive terminal 13 and control the firing of unijunction transistor Q1. Transistor Q4, resistor R7 and transistor Q2 provide a precharging path to precharge capacitor C3 to a potential determined by the potential at the collector of transistor Q2 less the potential drop across resistor R7 caused by conduction through transistor Q3. The characteristics of the PCMR circuit are such that the initial voltage to which capacitor C3 is precharged is inversely proportional to the current drawn by transistor Q3 through resistor R7 and directly proportional to the delay in firing unijunction transistor Q1 because it takes more time for the voltage across capacitor C3 to reach firing potential becuse of the cosine ramp charging effect of resistor R4.

The current drawn by transistor Q3 is determined by the base current supplied through Zener diode CR5 from the arm of potentiometer R13. As this potential rises, the current through transistor Q3 increases, and the pedestal height on capacitor C3 decreases, thus delaying the firing angle of the SCR's and thereby decreasing the average charging current. Since the SCR's are switching devices, the PCMR circuit in effect samples the battery potential only at the beginning of each half-sinusoid cycle. For once the ramp action begins, transistor Q4 becomes back-biased and no longer controls the pedestal or firing angle for that cycle. Furthermore, the battery potential being sampled is measured under essentially open-circuit conditions with nearly zero current flowing in the circuit. Thus, the circuit measures true electrochemical potential not influenced by series IR losses commonly encountered with d-c charging circuits. Furthermore, the potential measured in this manner is actually falling with a rate inversely proportional to the true state of charge of the battery. The faster the voltage falls, the lower is the state of charge of the battery, and the larger should be the charging current.

The potential control circuit comprises transistors Q5, Q6 and associated components. This circuit effectively alters the potential appearing at the arm of potentiometer R13; and hence the battery potential to which the charger is set to charge by causing switching transistor Q5 to close when the battery potential reaches a predetermined potential and thus reduce the battery potential to the float potential. For a 6 volt battery, these potentials are typically 6.9 and 6.53 volts, respectively. The higher charging potential is desirable to cause the battery to recharge more rapidly, and the small amount of gassing produced tends to mix the electrolyte and make its acid gradients diminish, thus providing a more uniform charge.

Having described the circuit arrangement, it is appropriate to review the mode of operation. The battery potential is sampled at the beginning of a power cycle and sets the firing angle for that cycle. The SCR's fire to cause the potential on terminal 13 to rise an amount proportional to the SCR conduction angle. The SCR ceases conduction at an angle of about 135°, and the battery voltage on terminal 13 immediately begins to fall at a rate determined by its state of charge. The firing angle on the next cycle is determined solely by the potential drop on terminal 13 from the time the SCR stopped conducting on the previous cycle. Because the PCMR circuit gives full 180° firing angle control, as the battery becomes more fully charged, the firing angle is retarded, the conduction angle of the SCR's decreases, the amount the battery potential rises during the SCR conduction interval decreases, the amount the battery potential relaxes also decreases, and the average charging current decreases. These relationships work out just right to provide the correct charging current to the battery, regardless of its state of charge, and sensitive only to its state of charge.

As explained above, the voltage at the collector of transistor Q2 is a pulse which increases in width as the average charging current decreases. This pulse is averaged by the averaging circuit comprising resistors R8 and R9 and capacitor C4 to produce a voltage at the base of transistor Q6 proportional to the charging current. As this current decreases, this averaged voltage rises until it causes transistor Q6 to conduct. This conduction causes transistor Q5 to conduct, shorting resistor R11. Since the battery voltage does not instantaneously change, the effect is to drive more current through Zener diode CR5, thereby further reducing the charging current and driving transistor Q5 on harder. The regenerative feedback occurs very rapidly to switch transistor Q5 abruptly on at the overshoot potential. The battery then drifts down in potential until the charging action again takes place. The amount the battery drifts down is exactly equal to the change in potential across resistor R11. At the lower potential, the battery will draw less current, thus keeping transistor Q5 saturated. Should a sudden load be placed on the battery at float potential, the regenerative action occurs in reverse, winding up with transistor Q5 off.

Referring to FIGS. 2A–2E, there is shown a graphical representation of signal waveforms plotted to a common time scale helpful in understanding the principles just described. At the left are waveforms when the battery is low and being fully charged. At the right are waveforms typical when the battery is fully charged and floating. In the middle are waveforms at 80 and 50 percent of full charge rate at potentials from 6.9 to 6.5 volts and from 6.5 to 6.9 volts, respectively.

FIG. 2A shows the rectified sinusoidal waveform across the secondary of transformer 14. FIG. 2B shows the rectified waveform at the junction of diodes CR3 and CR4 which effectively serves as the d-c source for transistors Q2 and Q3. FIG. 2C shows the battery potential on terminal 13. FIG. 2D shows the potential at the emitter of unijunction transistor Q1. FIG. 2E shows the potential at the collector of transistor Q2.

Having described the fundamental theory and operation of the circuit according to the invention, it is appropriate to consider certain features of the invention. The use of transistor Q2 in the arrangement shown provides at least the following features:

1. There is a precise clamping action on the upper base of unijunction transistor Q1 for accurately establishing the potential at which it will fire.

2. No precharging of capacitor C3 begins until the a-c input voltage at the junction of diodes CR3 and CR4 exceeds the battery potential by about 1.4 volts to help prevent premature firing of the SCR's.

3. The voltage at the collector of transistor Q2 appears as a pulse of width determined by the length of time the voltage at the junction of diodes CR3 and CR4 exceeds 1.4 volts, such time being determined by the commencement of precharging and the time at which the SCR's fire, and, by so firing, clamp the potential across them to approximately 1.4 volts. This results in the pulse width increasing and the firing angle becoming more delayed, action used by the overshoot circuits.

The use of resistor R6 connected to resistor R5 prevents the unijunction transistor Q1 from remaining latched on. For when it fires, it pulses transistor Q3 on which shorts the base of transistor Q4 to grounded negative terminal 15, removing current from the path including resistor R7 and transistor Q4 to the emitter of unijunction transistor Q1. If this action did not occur, transistor Q1 would fire once and remain latched on until the end of the power cycle. Should the firing pulse fail to trigger the SCR because of insufficient voltage across it, it would not again be triggered during that power cycle. The charger under these circumstances would fail to charge the battery when the battery was low. COnnecting resistor R6 to resistor R5 prevents this problem by forcing unijunction transistor Q1 to continue to fire until the SCR fires and, by raising the battery potential, reduces the pedestal height on capacitor C3 to shut off the unijunction transistor Q1 for the remainder of that power cycle.

The capacitive coupling to the gates of the SCR's provides an inexpensive solution to the more commonly used pulse transformer or much less desirable d-c coupling. A typical time constant for $R_1C_1$ is of the order of one-third the period of a cycle of the full-wave rectified waveform.

The PCMR circuit will not fire unless the voltage across the unijunction transistor Q1 exceeds about 3 volts. Thus, the circuit has automatic short circuit protection. On a dead battery, however, it would never start unless the current through transistor Q2 were provided to slowly recharge a dead battery to get its potential to rise to the point where normal charging action can begin.

The use of parallel SCR's as shown permits an SCR rated 8 amps rms to deliver 8 amps d-c. These components are more than three times less expensive than a single SCR rated 16 amps. That would be required in the conventional circuit using a single SCR with a pair of rectifiers at its input. The invention thus effects a reduction in cost. Furthermore, the power dissipation of the invention with only 1.4 volts diode potential drops is one-third less than the conventional circuits with 2.1 volts drop, resulting in considerably less expensive and less massive heat sinks And the use of two parallel power control elements provides a level of redundancy not possible with only one series connected element.

The use of capacitively coupled PCMR in accordance with the invention permits smooth full-wave control in a circuit with very little power dissipation. Because the SCR's are pulsed, rather than d-c triggered, the circuit remains accurate and reliable as the components age and over wide temperature variations.

The dual voltage references provides for rapid, accurate recharging performance superior to that obtained using only the float potential as a reference.

There has been described a preferred embodiment of the invention having numerous features. It is evident that those skilled in the art may now make numerous uses and modifications of and departures from the specific embodiment described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Electrical battery charging apparatus comprising, input terminal means for receiving a-c energy, output terminal means for receiving a potential from a battery to be charged, gated rectifier means intercoupling said input and output terminal means for converting said a-c energy into d-c energy for charging said battery, means for sensing the potential change across said output terminal means on each cycle of said a-c energy for providing gating pulses for determining the time interval during the following cycle said gated rectifier means conducts to control the charging current in accordance with the electrochemical potential of said battery and its state of charge to establish a full range of charging currents dependent upon the state of charge from full charging current to essentially zero current solely flowing through said gated rectifier means, means for applying said gating pulses to said gated rectifier means to provide a d-c current to said output terminal means representative of the state of charge of said battery, the source of said gating pulses comprising a pedestal and cosine modified ramp unijunction trigger circuit having a unijunction transistor with an emitter connected to an emitter capacitor and means for charging said capacitor through rectifying means in series between said emitter and said output terminal means, and circuit means for preventing said unijunction transistor from remaining latched on.

2. Electrical battery charging apparatus in accordance with claim 1 wherein said means for sensing includes means for sensing said potential change at the end of each cycle.

3. Electrical battery charging apparatus in accordance with claim 1 wherein said gated rectifier means comprises a pair of controlled semiconductor devices for delivering current pulses to said semiconductor devices for delivering current pulses to said output terminal means.

4. Electrical battery charging apparatus in accordance with claim 1 and further comprising a source of gating pulses for rendering said gated rectifier means conductive,
capacitive means for coupling said gating pulses to gate electrode means of said gated rectifier means,
and resistive means connected between said gate electrode means and one other electrode of said gated rectifier means.

5. Electrical battery charging apparatus in accordance with claim 1 wherein said means for preventing said unijunction transistor from being latched on comprises a transistor having its base direct-coupled to said output terminal means,
a first resistance intercoupling the latter base and a base of said unijunction transistor,
and a second resistance intercoupling the latter base and a common terminal normally maintained at reference potential.

6. Electrical battery charging apparatus in accordance with claim 1 wherein said means for charging said capacitor comprises,
a first transistor having its base connected to said output terminal means and its collector connected to a charging resistor with said rectifying means connected between said charging resistor and said unijunction emitter.

7. Electrical battery charging apparatus in accordance with claim 6 and further comprising a second transistor connected to said rectifying means for controlling the charging of said capacitor,
the base of said second transistor being direct-coupled to said output terminal means,
means for preventing said unijunction transistor remaining latched on comprising a first resistance interconnecting said second transistor base and a base of said unijunction transistor and a second resistance interconnecting the latter base and a common terminal normally maintained at reference potential.

8. Electrical battery charging apparatus in accordance with claim 7 and further comprising a potential control circuit comprising resistance connected to said output terminal means and means responsive to the occurrence of a predetermined overshoot potential on said output terminal means for reducing the resistance connected thereto and lowering the potential on said output terminal means.

9. Electrical battery charging apparatus in accordance with claim 8 wherein said potential control circuit comprises,
averaging circuit means responsive to the signal on said first transistor collector for providing an averaged signal representative of the average value of the signal on the latter collector,
a third transistor rendered conductive in response to the averaged signal provided by said averaging circuit means reaching a predetermined level,
and a fourth transistor rendered conductive when said third transistor conducts for bypassing at least part of said resistance connected to said output terminal means.

10. Electrical battery charging apparatus in accordance with claim 9 and further comprising, unilaterally conducting means intercoupling said gated semiconductor means and the emitter of said first transistor for providing operating potentials for said circuits and for delivering a starting charging current to said output terminal means when a battery connected thereto is in a fully discharged state.

11. Electrical battery charging apparatus in accordance with claim 6 and further comprising, unilaterally conducting means intercoupling said gated semiconductor means and the emitter of said first transistor for providing operating potentials for said circuits and for delivering a starting charging current to said output terminal means when a battery connected thereto is in a fully discharged state.

12. Electrical battery charging apparatus in accordance with claim 11 wherein said potential control circuit comprises, averaging circuit means for providing a signal related to the charging current provided at said output terminal means, and transistor circuit means rendered conductive in response to the averaged signal provided by said averaging circuit means reaching a predetermined level for bypassing a resistor connected to said output terminal means.

* * * * *